US006399623B1

(12) United States Patent
Myles-Gardiner et al.

(10) Patent No.: US 6,399,623 B1
(45) Date of Patent: Jun. 4, 2002

(54) WOOD TREATMENT

(75) Inventors: Shelley Myles-Gardiner; Philip Eric Russell; Michael Allan Webb; Robin John Williams, all of Cambridge (GB)

(73) Assignee: Agrevo UK Ltd. (GB)

( * ) Notice: Subject to any disclaimer, the term of this patent is extended or adjusted under 35 U.S.C. 154(b) by 0 days.

(21) Appl. No.: 09/977,811

(22) Filed: Oct. 15, 2001

Related U.S. Application Data

(62) Division of application No. 09/298,643, filed on Apr. 23, 1999, now Pat. No. 6,303,616.

(30) Foreign Application Priority Data

Apr. 25, 1998 (GB) ............................................ 9808755

(51) Int. Cl.[7] ........................ A01N 43/54; A01N 57/18; A01N 43/50

(52) U.S. Cl. ........................ 514/259; 514/141; 514/399

(58) Field of Search ................................. 514/259, 141, 514/399

(56) References Cited

U.S. PATENT DOCUMENTS 5,476,868 A * 12/1995 Wingert et al. ............. 514/383

FOREIGN PATENT DOCUMENTS

| | | | |
|---|---|---|---|
| EP | 0555186 | * | 8/1992 |
| WO | 9800021 | * | 1/1998 |

OTHER PUBLICATIONS

Tomlin, The Pesticide Manual Incorporating the Agrochemical Handbook $10^{th}$ Ed. (1995) pp. 498+499.*

* cited by examiner

*Primary Examiner*—Allen J. Robinson
(74) *Attorney, Agent, or Firm*—Ostrolenk, Faber, Gerb & Soffen, LLP

(57) ABSTRACT

Fluquinconazole can be used to combat wood damaging fungi.

7 Claims, No Drawings

WOOD TREATMENT

CROSS REFERENCE TO RELATED APPLICATIONS

This is a divisional of U.S. patent application Ser. No. 09/298,643, filed Apr. 23, 1999, now U.S. Pat. No. 6,303, 616, in the name of Shelley Myles-Gardiner, Philip Eric Russell, Michael Allan Webb, and Robin John Williams and entitled "WOOD TREATMENT".

FIELD OF THE INVENTION

This invention relates to wood preservation.

It is disclosed in EP 555186 that certain triazole fungicides can be used to combat wood damaging fungi.

We have now found that fluquinconazole, whose chemical structure is quite different from the compounds disclosed in EP 555186, is very effective in controlling wood damaging fungi and particularly basidiomycete fungi, which cause rot, as well as sapstain fungi which spoil the appearance of the wood.

Fluquinconazole is a known fungicide and is the common name for 3-(2,4-dichlorophenyl)-6-fluoro-2-(1H-1,2,4-triazol-1-yl)-4(3H)-quinazolinone).

The invention thus provides the use of fluquinconazole for combating wood damaging fungi, in particular basidiomycete wood rotting fungi.

Examples of fungi that can be controlled using fluquinconazole include *Coriolus versicolor, Poria placenta, Lentinus lepideus, Trametes versicolor, Serpula lacrymans, Coniophora puteana* and *Gloeophyllum trabeum.*

In general the wood rotting fungi appear as a complex of two or more of these species.

We have also found that the fluquinconazole is particularly effective when used in combination with other fungicides, such as tebuconazole and/or dichlone, and the invention includes a mixture of fluquinconazole with tebuconazole and/or dichlone. Other possible mixture partners include carbendazim, prochloraz, sipconazole and cyproconazole.

The fluquinconazole is applied in the form of a suspension concentrate, usually containing surfactants and other conventional additives and usually after dilution with water. If desired the fluquinconazole can also be used in combination with a phosphonate compound as described in our WO 98/00021. The concentration of the fluquinconazole may vary over a wide range, e.g. from 0.001 to 10%, preferably from 0.1 to 1%, by weight. The ratio of phosphonate to fluquinconazole can vary over a wide range but is preferably from 5:1 to 1:1.

The invention is illustrated in the following examples.

EXAMPLE 1

In Vivo Test of Activity Against Wood Destroying Fungi

Pieces of pine were dipped into a fluquinconazole formulation containing di(2-ethylhexyl)octyl phosphonate at different rates and then removed and put, whilst soaking wet, into a polythene bag which was sealed and left in a greenhouse for 5 weeks. The degree of control of wood rotting fungi (mainly basidiomycetes) was then assessed. At 100 ppm fluquinconazole, 73.1% control was achieved compared with standards which contain no pesticide.

EXAMPLE 2

In Vivo Test of Activity Against Sapstain Fungi

Bundles consisting of 7 pieces of freshly cut pine (approximate sizes of 20 cm×30 cm) were dipped in a 50% suspension concentrate of fluquinconazole, diluted to 0.25%, for 60 seconds, ensuring each piece of wood was separated from its contacting pieces. The wood was removed from the liquid and allowed to drain for 10 seconds and then placed in an unsealed polythene bag at room temperature. The bag was used in order to maintain a high relative humidity, which promotes growth of sapstain. The wood was removed for examination after 4 weeks and divided into two in order to expose the centre of the bundles. These were assessed for sapstain infection. After 4 weeks the fluquinconazole treated wood showed a >60% control of the sapstain compared with wood dipped only in water.

EXAMPLE 3

In Vitro Test of Activity Against Wood Destroying Fungi

A 50% SC of fluquinconazole (fq) was incorporated into malt agar at various rates and the agar placed into Petri dishes. Into the centre of each plate was implanted a 4 mm plug of the mycelium of a wood rotting fungus. The plates were kept at 20° C. in a darkened room for 6 days when the control of the fungus by the fluquinconazole was assessed. The experiment was also carried out with a fluquinconazole formulation containing di(2-ethylhexyl)octyl phosphonate (ph) with and without prochloraz (pz). The results are shown below.

| | | % Control based on colony diameter | | | |
|---|---|---|---|---|---|
| Treatment | ppm | Assessed after 6 days *Coniophora puteana* | Assessed after 6 days *Coriolus versicolor* | Assessed after 11 days *Gloephyllum trabeum* | Assessed after 6 days *Poria placenta* |
| fq | 100 | 77.9 | 100.0 | 94.0 | 100.0 |
| fq | 25 | 68.7 | 100.0 | 92.5 | 100.0 |
| fq | 10 | 84.7 | 100.0 | 95.0 | 100.0 |
| fq | 5 | 75.6 | 100.0 | 94.0 | 100.0 |
| fq | 1 | 50.4 | 100.0 | 80.5 | 99.4 |
| fq (100 g/l) + ph | 100 | 74.0 | 100.0 | 89.0 | 100.0 |
| fq (100 g/l) + ph | 25 | 70.2 | 100.0 | 89.0 | 100.0 |
| fq (100 g/l) + ph | 10 | 69.5 | 100.0 | 86.0 | 100.0 |
| fq (100 g/l) + ph | 5 | 59.5 | 100.0 | 87.5 | 100.0 |

-continued

| | | % Control based on colony diameter | | | |
|---|---|---|---|---|---|
| Treatment | ppm | Assessed after 6 days *Coniophora puteana* | Assessed after 6 days *Coriolus versicolor* | Assessed after 11 days *Gloephyllum trabeum* | Assessed after 6 days *Poria placenta* |
| fq (100 g/l) + ph | 1 | 55.0 | 100.0 | 82.0 | 100.0 |
| fq (54.7 g/l) + pz (175 g/l) + ph | 100 | 100.0 | 100.0 | 97.0 | 100.0 |
| fq (54.7 g/l) + pz (175 g/l) + ph | 25 | 93.1 | 100.0 | 96.0 | 98.3 |
| fq (54.7 g/l) + pz (175 g/l) + ph | 10 | 74.0 | 100.0 | 89.0 | 97.2 |
| fq (54.7 g/l) + pz (175 g/l) + ph | 5 | 63.4 | 100.0 | 84.5 | 98.3 |
| fq (54.7 g/l) + pz (175 g/l) + ph | 1 | 36.6 | 85.1 | 66.0 | 68.2 |

What is claimed is:

1. A method of protecting wood against damaging fungi which comprises applying a composition to the wood containing a phosphonate and an antifungal effect of the amount of fluquinconazole.

2. The method of claim 1 in which the fluquinconazole concentration in the formulation is from 0.001 to 10 wt. %.

3. The method of claim 2, wherein the ratio of phosphonate to fluquinconazole is from 5:1 to 1:1.

4. The method of claim 3, wherein the fluquinconazole concentration is 0.1 to 1% by weight.

5. The method of claim 1, wherein the fluquinconazole is applied in combination with prochoraz.

6. The method of claim 5, wherein the ratio of phosphonate to fluquinconazole is from 5:1 to 1:1.

7. The method of claim 6, wherein the fluquinconazole concentration is 0.1 to 1% by weight.

* * * * *